United States Patent [19]
Yaccino

[11] 3,818,454
[45] June 18, 1974

[54] CARD READER-IMPRINTER REMOTE TERMINAL

[75] Inventor: Michael Joseph Yaccino, Mechanicsburg, Pa.

[73] Assignee: AMP Incorporated, Harrisburg, Pa.

[22] Filed: Mar. 20, 1972

[21] Appl. No.: 236,292

Related U.S. Application Data

[63] Continuation-in-part of Ser. No. 32,150, April 27, 1970, abandoned.

[52] U.S. Cl. ............................................. 340/172.5
[51] Int. Cl. ........ H04j 3/00, G06f 3/04, G06f 11/00
[58] Field of Search .................................. 340/172.5

[56] References Cited
UNITED STATES PATENTS

| | | | |
|---|---|---|---|
| 3,308,439 | 3/1967 | Tink et al. | 340/172.5 |
| 3,394,246 | 7/1968 | Goldman | 235/61.7 |
| 3,445,633 | 5/1969 | Ratner | 340,235/172.5;61.7 |
| 3,447,457 | 6/1969 | Dechert, Jr. et al. | 101/269 |
| 3,454,936 | 7/1969 | Bridge et al. | 340/172.5 |
| 3,465,289 | 9/1969 | Klein | 340/149 |
| 3,505,646 | 4/1970 | Affel, Jr. et al. | 340/172.5 |
| 3,516,068 | 6/1970 | Howard et al. | 340/172.5 |
| 3,517,130 | 6/1970 | Rynders | 179/15 |
| 3,539,998 | 11/1970 | Belcher et al. | 340/172.5 |
| 3,543,242 | 11/1970 | Adams, Jr. et al. | 340/172.5 |
| 3,566,365 | 2/1971 | Rawson et al. | 340/172.5 |
| 3,573,739 | 4/1971 | Zeittin | 340/172.5 |
| 3,573,749 | 4/1971 | Smith | 340/172.5 |
| 3,613,054 | 10/1971 | Ricard | 340/172.5 |
| 3,623,010 | 11/1971 | Burkholter | 340/172.5 |

*Primary Examiner*—Paul J. Henon
*Assistant Examiner*—Paul R. Woods
*Attorney, Agent, or Firm*—Gerald K. Kita

[57] ABSTRACT

The disclosure relates to a remote terminal card reader-imprinter facility which is connectable to a central facility via telephone lines or the like. The remote terminal scans information set into the scanner including the information on a coded card upon command and transmits same to the central facility, the reader-imprinter providing a printing operation only upon receipt of predetermined information from the central facility. The scanner includes the features of checking all positions to be scanned prior to scanning to locate a faulty circuit such as a ground. The scanner further includes a circuit wherein at least one indicia switch must be moved from a position in which it was set during a prior scan before the scanner can be activated. Furthermore, an error detector is provided at the scanner output which counts the number of characters transmitted and provides a retransmit signal in the event the proper number of characters has not been transmitted to the output. The disclosure also includes a multiplexer for use with a plurality of remote terminals for transmitting information from the remote terminals to the central facility.

8 Claims, 6 Drawing Figures

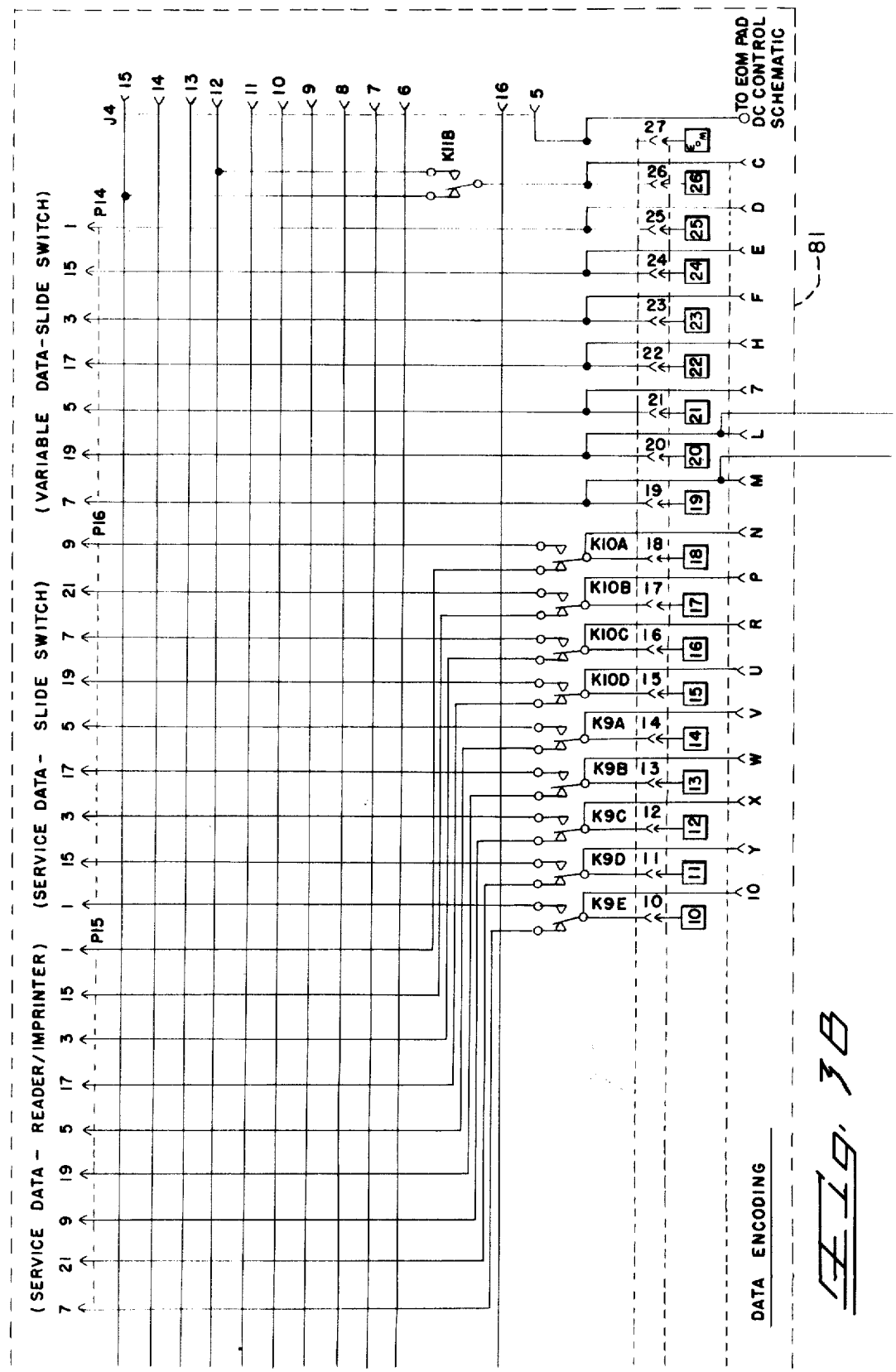

CARD READER-IMPRINTER REMOTE TERMINAL

This is a continuation-in-part of my copending application, Ser. No. 32,150, now abandoned, filed Apr. 27, 1970.

This invention relates to card reader-imprinter remote terminal and, more particularly, to a remote terminal facility capable of scanning and transmitting information received from a coded card or a pair of coded cards and auxiliary information providing devices, transmitting such information to a central location and, being capable of receiving signal indicative that the terminal may transmit if ready.

With the increased use of coded cards it now has become apparent that such cards can be used in environments other than credit for the quick and accurate transmission of data.

Briefly, in accordance with the present invention, a coded card is placed into a reader-imprinter, said reader-imprinter also having manually settable devices associated therewith, and/or provision for receiving a second coded card in order to provide additional information such as particular patient or customer, the cost of the item or service being purchased or performed and any other information which may be desirable. In accordance with the present invention, the auxiliary information is set into the scanner along with the coded card and the scanner is then made to operate whereby all scanning points are pre-checked to be sure that no scanning points are initially grounded. Also a "must move" circuit is operated. The information is then sent out along a line to a remote central facility if the circuits have no faults. The information sent to the central facility can be stored in accordance with the designation of the particular coded card associated therewith to provide simple billing or information retrieval procedures at the end of the month from the single central facility.

It is therefore an object of this invention to provide a remote card reader-imprinter terminal capable of transmitting desired information to a central station and capable of receiving an answer back signal indicative of the status of the account.

It is a further object of this invention to provide a card reader-imprinter system capable of supplying total billing information to a central unit.

The above objects and still further objects of this invention will become apparent to those skilled in the art after consideration of certain preferred embodiments thereof which are provided by way of example and not by way of limitation wherein.

Figure 1:
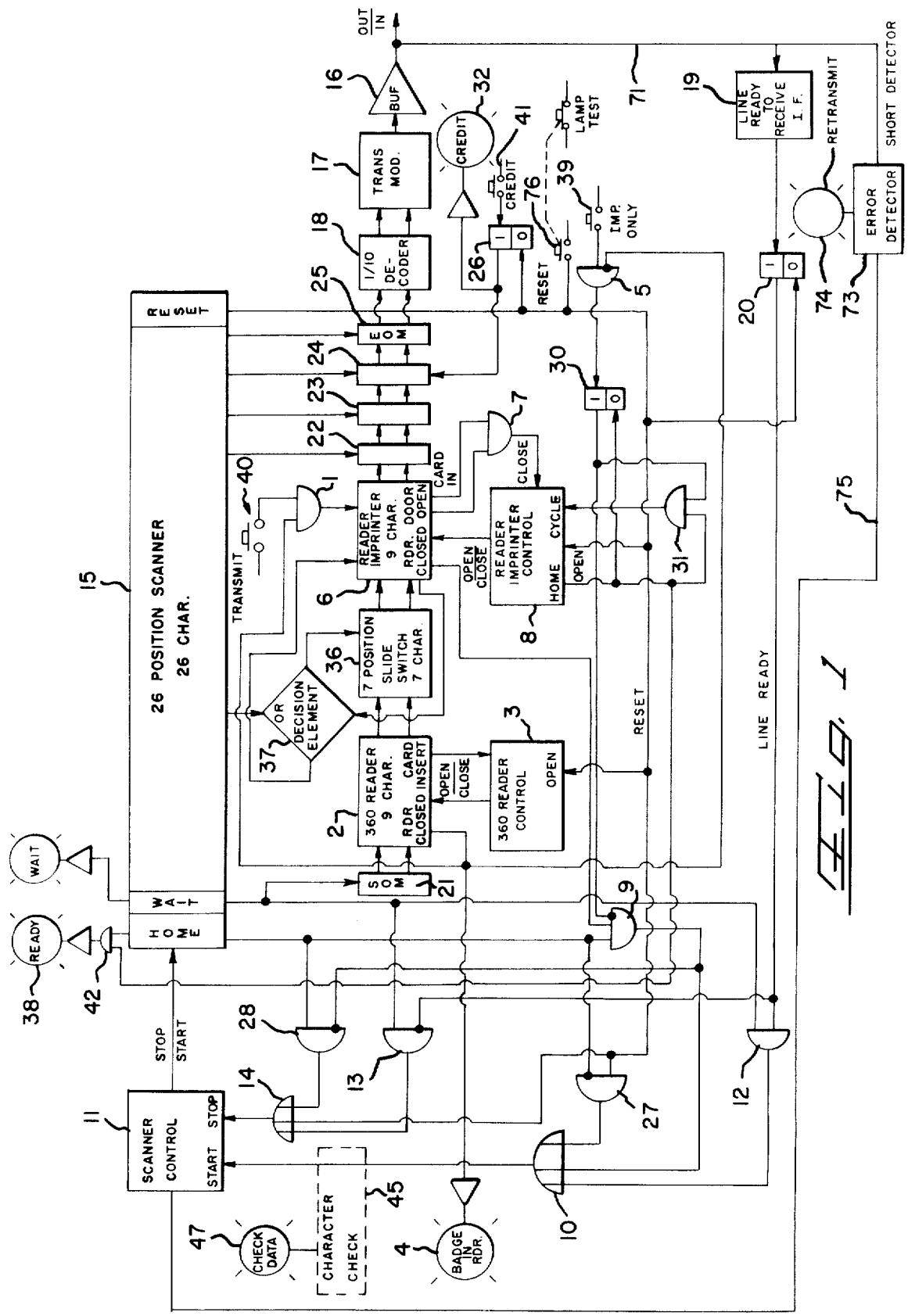
FIG. 1 is a block diagram of a card reader-imprinter remote terminal in accordance with the present invention.

The system operates as follows. The operator places the coded badge card into the 360 reader 2 and the reader, once it senses that a card has been inserted therein, will automatically, by means of a reader control 3, cause the reader to close. This closure of reader 2 with a card therein will apply a signal to the badge in reader lamp 4, causing it to light for visual indication to the operator of system status. Additionally, the fact that the reader 2 is closed will be transferred to one input of the "and" gate 1 and will also be transferred as an inhibit to the imprint only gate 5. The operator now takes a second coded card and inserts it and an invoice slip into the reader-imprinter 6. The placing of the second card into the reader-imprinter 6 enables one side of the "and" gate 7. The operation of the transmit button 40 completes the "and" function on the gate number 1 and causes the reader-imprinter 6 and specifically the door thereof to close, which in turn, via the reader imprinter control 8, causes the reader-imprinter to close on the card. The fact that the reader-imprinter has now closed on the card is transferred from the reader-imprinter 6 over to gate 9 as one input thereto.

The scanner 15 normally will be in the home position so the other input on gate 9 is completed. Since it is not an imprint only operation, the inhibit is not present on gate 9 and the gate is therefore completed and true. The output thereof is fed to "or" gate 10, the output of which is fed to a character check circuit 45 which tests to see that all points to be scanned by the scanner 15 (to be explained later) are in working condition via "OR" circuitry coupled to all of the scanning points (not shown). If any of the scanning points are not in proper working order, a signal is provided to light the check data lamp 47. Otherwise, a signal is passed to scanner control 11 which causes the scanner to move from the home position to the wait or start of message position. The scanner 15 will stop on the wait or start of message position. This is accomplished by means of the output from the wait or start of message position via "and" gate 12. Gate 12 is not yet true. In addition, the scanner, being in the wait position, will apply a logic "one" to one side of gate 13. Gate 13, is not inhibited by the fact that the flip flop 20 to the line ready is set at that time. The output of gate 13 is fed into "or" gate 14 which causes the scanner control 11 to stop the scanner 15 on the wait position.

The scanner 15 must produce a start of message character. The start of message character producer 21 is fed into the transmission modulator 17 which is a touch tone oscillator of the type described in copending application, Ser. No. 32,019, now abandoned, filed Apr. 27, 1970 for Card Reader-Imprinter Satellite Facility. The start of message does not go through the one out of ten decoder 18. The start of message tone or tones, which are preferably 1209 and 941 cps, are fed via the buffer amplifier 16 to the output line. This serves to notify the multiplexer 51 at the other end that this terminal is requesting a transmission.

The multiplexer, when making its duly appointed rounds, will eventually come to the pair of wires at this terminal and recognize that the start of message tone is present. When it does that, it will short circuit the wires at its ends, thus creating a signal which is detected and suitably conditioned by the line ready to receive interface 19. This sets the flip flop 20 and tells the terminal that the line is ready to receive the message therefrom. The fact that the line ready goes true completes "or" gate 10 via "and" gate 12 and scanner control 11 is started and causes the scanner 15 to move off of the wait position. The scanner will then scan the 25 characters of data which consist of the 10 characters from the coded badge card as read by the 360 reader 2 and either the seven position slide switch 36 or the coded card in the reader-imprinter depending upon whether a special coded badge card is inserted into the reader-imprinter to operate "or" gate 37. Additionally, the scanner will scan out two digits of dollar value 22 and five digits of amount or quantity of the transaction plus one character representing credit or debit 24. The last character transmitted will be the end of message character 25.

Upon completion of the set transmission of these characters in the touch-tone mode, the scanner 15 will reach the reset position. The reset line does many things simultaneously. It will, if the credit-debit flip flop 26 is set, reset it. It will also cause the reader-imprinter to cycle back to the home position via the reader-imprinter control 8 and it will cause the 360 reader 2 via the reader control 3 to release the coded badge card which will pop up and it will cause the scanner to move off of the reset position if it had stopped therein.

The scanner originally was stopped on the reset position by means of gate 14 and the reset signal thereto. Now the reset signal will restart the scanner 15 by means of gate 27. The scanner will proceed to home and will be stopped by means of the signal from home to gate 28. When the scanner 15 stops in the home position the ready light 38 will go on since both inputs to "and" gate 42 will be enabled.

The system may also be used in the imprint only mode. In this mode no coded badge card is loaded into the 360 reader 2. Therefore, the inhibit on gate 5 is not present. If the imprint only button 39 is depressed, the flip flop 30 will be set. Prior to this the coded badge card to be imprinted plus the slip has been loaded into the reader-imprinter 6. The setting of flip-flop 30 will complete one side of the input to the reader-imprinter control 8 via gate 31 and will additionally inhibit gate 9, preventing the scanner from moving since the data is not scanned in the imprint only position. Only the reader-imprinter 6 is made to cycle. Since the reader-imprinter control 8 says that the reader-imprinter 6 is in the home position, then both inputs to gate 31 will be completed and this will cause the reader-imprinter control make the reader-imprinter 6 cycle. The reader-imprinter 6 will basically go to the read position and continue on through its scan, causing the data embossed on the card therein to be imprinted onto the slip. The reader-imprinter 6, by means of the reader-imprinter control 8 will then stop in the home position.

One other variation possible is to transmit a credit character in place of the normal debit character. This is achieved by means of the credit push button 41 and flip flop 26. Once more, the message to be transmitted consists of the coded badge card which is inserted into the 360 reader 2 and the second coded card which is placed into the reader-imprinter 6 with the slip. The information is placed in the dollar register 22 and the amount register 23. The complete message is now composed when the push button 41 indicating credit is depressed. This will set flip flop 26, lighting the credit light 32. In addition this will modify character bumper 24. Thus when the message is transmitted in normal manner described previously, the credit or debit character will now be transmitted as a credit character. This will allow cancellation of previous messages or a credit transaction taking place due to some error.

Figure 2:
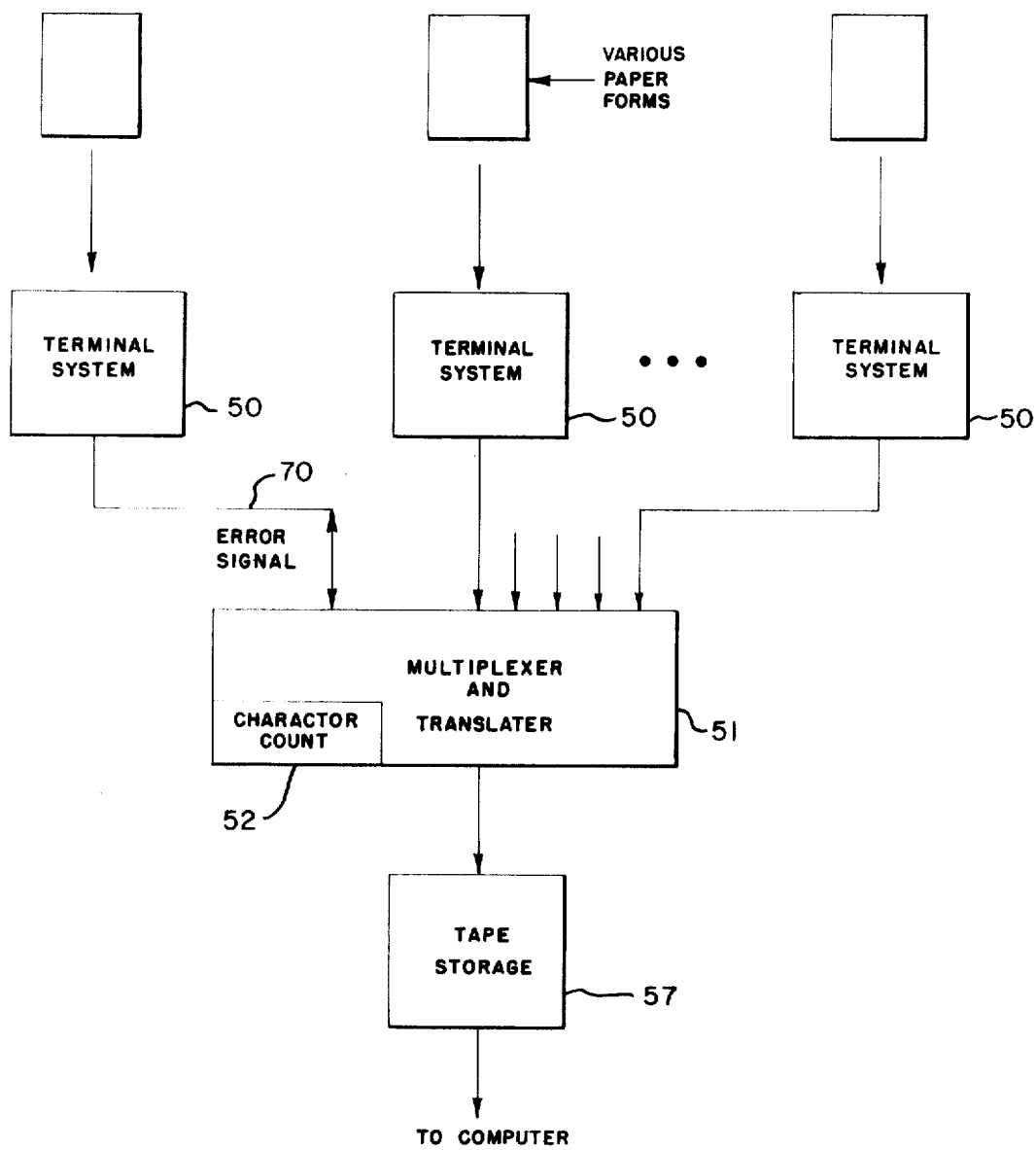
FIG. 2 is a block diagram of a multiplex system for use with plural terminals of the type in FIG. 1.
Figure 70:
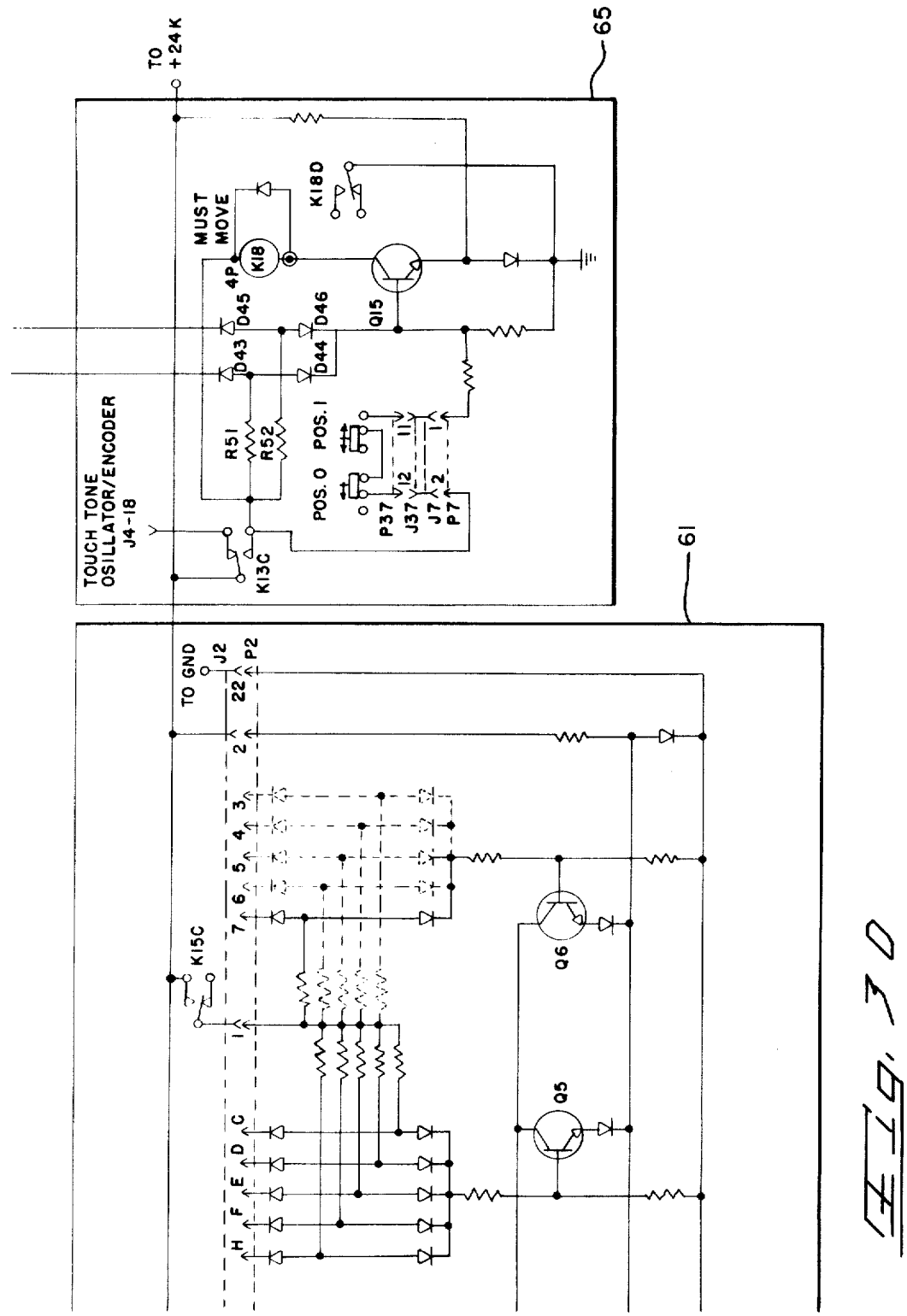

Referring now to FIG. 2, there is shown a multiplex system for use with plural remote terminals 50 of the type described in detail with respect to FIG. 1. Each of the remote terminals 50 is coupled to a central multiplexer 51. Upon scanning of a terminal 50 which is ready to transmit, the multiplexer, during its scan, senses such condition and places a momentary short circuit on the line indicating a ready to transmit condition. The terminal 50 now transmits its information to the multiplexer 51 where the tones are decoded and translated to binary code, the binary code being stored in a tape storage 57. The stored code is then sent to a computer.

Figure 3A:
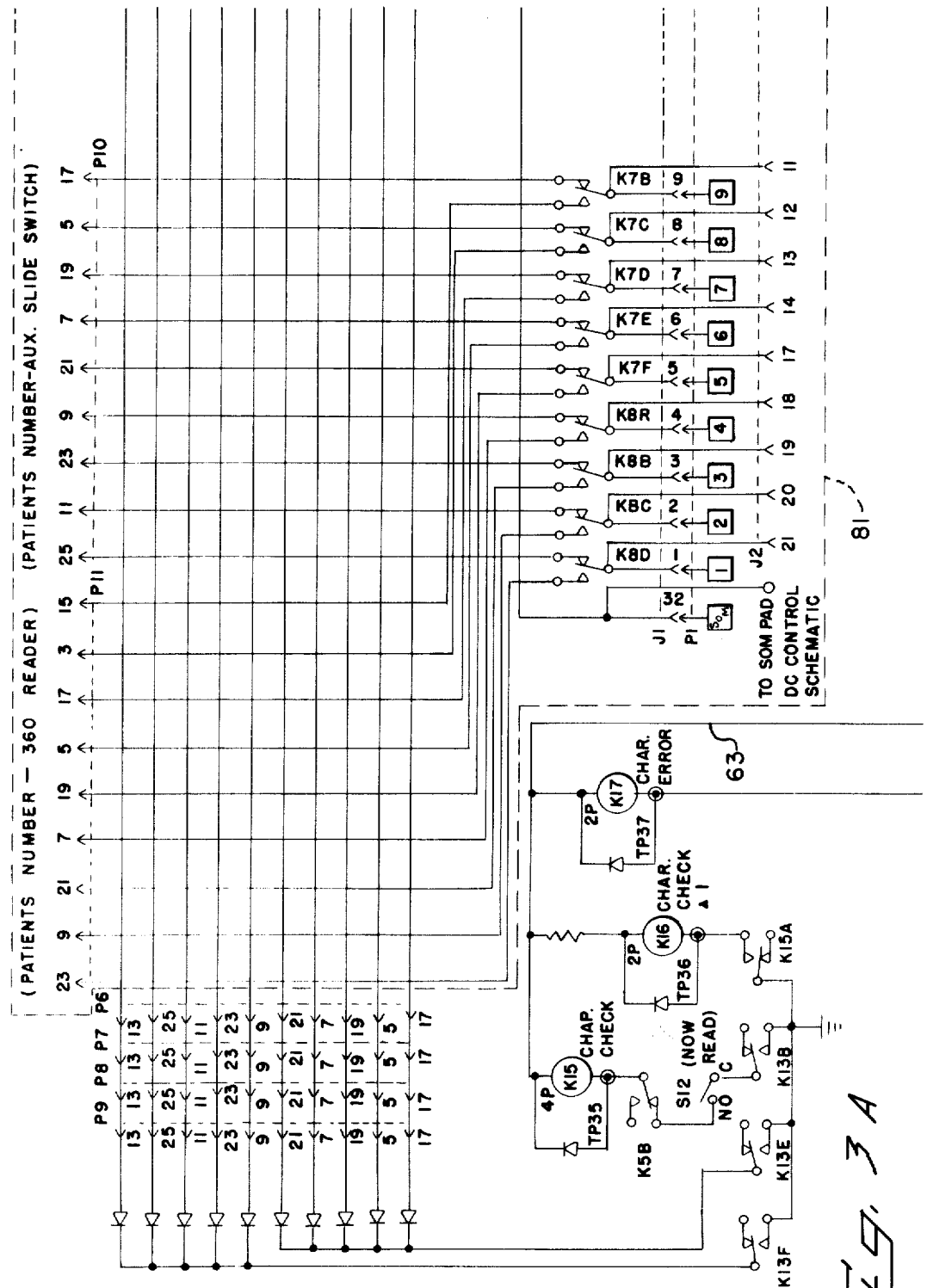
FIG. 3 is a circuit diagram of the scanning, encoding and error check circuits.
Figure 7C:
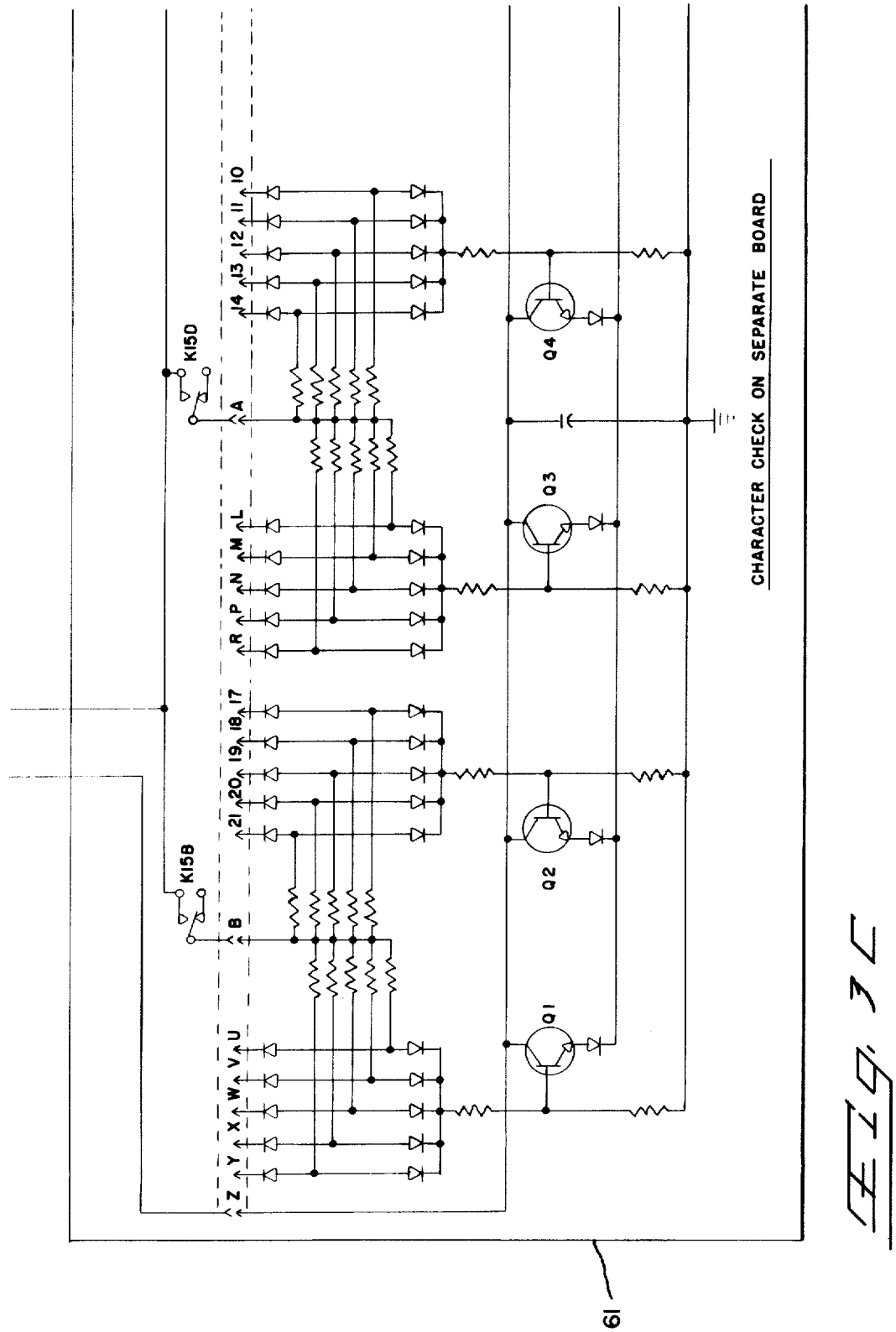

Referring now to FIG. 3, there is shown a schematic diagram of the scanner with encoding and character check circuits and "must move" circuit. A matrix circuit 81, labelled "data encoding," is scanned sequentially on a column by column basis by the scanner device of a type which is well known in the art. The scanner will first start on the start of message for SOM pad to provide a start of message indication. Then the scanner will move through all of the twenty six positions noted by numbers 1 through 26 and end on the end of message (EOM) position. Each of the twenty six positions on the matrix is initially set at one of ten cross points or rows thereon by means of the numbers 2, 36, 6, 22, 23 and 24 of FIG. 1. It can therefore be seen that as the scanner moves from point to point, an output will be provided for each of the columns along one of the rows numbered 6 through 15 at the right of the matrix 81. The scanner data is sequentially read out from the terminal in the manner previously described with respect to FIG. 1.

Prior to the start of a scanning operation, the matrix must be checked for operation to determine that there are no faults. Accordingly, at the start of an operation, each of the contacts K13B, K13E and K13F is pulled to the lower position and then a character check is performed. It is necessary that there are contacts on all of the lines. K17 indicates an error. If any one of the transistors Q1 through Q6 of character check circuit 61 is conducting, that means that there is a bad character somewhere and this causes relay K17 to operate. The error is due to an open circuit in the matrix 81. When K17 is operating, the light 47 of FIG. 1 is lit.

A relay K13 (not shown) energizes relay K15 which applies power to all of the transistors. So K15 actually operates to check all the characters and gives the command to do the check. Relay K17 lights the light 47 of FIG. 1. Relays K15, K16 and K17 are all one circuit. At the start of a scan relay K13 (not shown) is energized and each of the K13 contacts is placed back into the upper position as shown in FIG. 3, this including contact K13C of the "must move" circuit. Before a scan can take place the "must move" circuit must also be operated. This requires that one of the switches corresponding to M and L in FIG. 3 must be moved. Power is furnished through resistors R51 and R52, so if there is a ground on the cathode of diode D43 or D45, transistor Q15 cannot be energized. As soon as the buttons on the switch are moved, the ground is removed from diodes D43 or D45 and allows current to go through diodes D44 and D46 and operate relay K18.

Also the position 1 (Pos 1) and position 0 (Pos 0) switches provide anothe circuit that can turn on transistor Q15. For this circuit to be operated, the switches L and M must be in the zero position. Relay K18 is merely an inhibit on the scanner control 11 (FIG. 1) and removes the inhibit and allows the scanner control to operate. It can therefore be seen that there are two inhibits of the scanner control 11. The position 0 and position 1 switches are a function which requires that position L and M must not only be moved but be placed in position 00. If they are already in the 00 state, they do not have to be moved but if they have not been in a 00 state they must be moved. The 00 can override the "must move" in circuit 65.

The error detection is provided in the multiplexer by a counter 52 shown therein by a block in FIG. 2 and in FIG. 1 as error detector 73. The multiplexer circuit counts the number of characters that are coming out of the buffer 16 of FIG. 1 because the character is on for a certain period of time and off for a certain period of time (60 milliseconds and 60 milliseconds off). So after a particular period in which 26 characters should have been scanned, if a cound of 26 is not received in the character counter 52, the multiplexer will send an error signal back along the line 71 of FIG. 1 to the error detector 73 and light a retransmit light 74. If all of the characters have been received properly, the error detector circuit 73 will provide a signal along the line 75 which will allow the scanner control 11 to return to the home position. If an error is detected and the retransmit light 74 is lit, it is necessary to operate the transmit button 40 again and to retransmit the data in the manner previously described.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A card reader-imprinter system which comprises a plurality of remote terminals, a central multiplex terminal connected to each of said remote terminals, each of said remote terminals comprising reader means for receiving a first coded card, register means for storing manually settable information therein, reader-imprinter means for receiving a second coded card, means for scanning information from said first and second coded cards and from said register means for transmission to said central multiplex terminal, means for generating a command signal when a printing only operation is desired, said reader-imprinter means providing said printing only operation of said information on said second card in response to said command signal, and means responsive to said command signal for inhibiting operation of said scanning means.

2. A card reader-imprinter system as set forth in claim 1 wherein said inhibiting means includes additional means responsive to a predetermined fault condition in said scanning means for inhibiting operations of said scanning means.

3. A card reader-imprinter system as set forth in claim 2 wherein said scanning means includes a matrix memory circuit and wherein said scanning means includes means responsive to a fault in said matrix memory circuit for inhibiting operation of said scanning means.

4. A card reader-imprinter system as set forth in claim 1 wherein said scanning means includes plural switches movable to plurality of switch positions and said inhibiting means includes means responsive to a predetermined settings of each of said switches, said inhibiting means not inhibiting said scanning means for simultaneous predetermined setting of said switches.

5. A card reader-imprinting system as set forth in claim 2 wherein said scanning means includes plural switches movable to a plurality of switch positions and said inhibiting means includes means responsive to predetermined settings of each of said switches, said inhibiting means not inhibiting said scanning means for simultaneous predetermined setting of said switches.

6. A card reader-imprinter system as set forth in claim 3 wherein said scanning means includes plural switches movable to a plurality of switch positions and said inhibiting means includes means responsive to predetermined settings of each of said switches, said inhibiting means not inhibiting said scanning means for simultaneous predetermined setting of said switches.

7. A remote terminal card-reader-imprinter system, which comprises:

a plurality of remote terminals for receiving and sending touch-tone signal information;

a multiplexer for receiving said touch-tone information from said plurality of remote terminals which includes means for converting said touch-tone signals into binary signals;

computing means for receiving said binary signals from said multiplexer;

each of said remote terminals comprising:

reader means for receiving a first coded card and for translating information on said first card into a first set of electrical signals including means for transmitting a first control signal upon the closure or said reader means after the insertion of said first card;

reader-imprinter means for receiving a second coded card and an invoice slip and for translating information on said second card into a second set of electrical signals including means for transmitting a second control signal upon the closure of said reader-imprinter means after the insertion of said second card;

an imprint-only switch means for generating a third control signal received by said reader-imprinter means whereby information on said second coded card is imprinted on said invoice slip;

means responsive to said first contral signal for inhibiting said third control signal from reaching said reader-imprinter means;

matrix memory circuit means for receiving and storing said first and second sets of electrical signals;

means for scanning said matrix memory circuit means from an initial to a final position whereby said first and second sets of electrical signals are transmitted to said multiplexer;

reset switch means activated after said scanning means has completed its scan of said matrix memory circuit means for generating a reset signal to open said reader means and said reader-imprinter means whereby said first and second coded cards may be respectively removed therefrom;

scanner control means responsive to said second control signal for starting said scanning means and responsive to said reset signal for resetting said scanner means in said initial position; and means responsive to said third control signal for inhibiting said second control signal from reaching said scanner control means.

8. The remote terminal card reader-imprinter system of claim 7, which further comprises a character check circuit means responsive to said second control signal for checking the working condition of said matrix memory circuit means and for providing a visual indication of said condition.

* * * * *